United States Patent [19]
Ballu

[11] 3,852,964
[45] Dec. 10, 1974

[54] FLOATING ANTI-POLLUTION DEVICE

[75] Inventor: Louis Ballu, Epernay, France

[73] Assignee: Kleber-Colombes, Paris, France

[22] Filed: July 14, 1972

[21] Appl. No.: 271,825

[30] Foreign Application Priority Data
July 15, 1971  France .............................. 71.26043

[52] U.S. Cl. .................................... 61/1 F, 61/5
[51] Int. Cl. ........................ E02b 15/04, E02b 3/06
[58] Field of Search ............... 61/1 F, 1, 5; 210/242, 210/DIG. 21

[56] References Cited
UNITED STATES PATENTS
3,476,246  11/1969  Dahan .............................. 61/1 F X
3,599,434  8/1971  Missud ................................. 61/5 X Primary Examiner—W. C. Reynolds
Assistant Examiner—Philip C. Kannan
Attorney, Agent, or Firm—Craig & Antonelli

[57] ABSTRACT

A floating anti-pollution device such as a barrage or barrier which is intended to stop materials and bodies floating on the surface of water and which includes a skirt provided with suitable ballast supported by float elements; means are provided to permit a change in the height of the skirt in such a manner as to vary the draught of the device.

18 Claims, 8 Drawing Figures

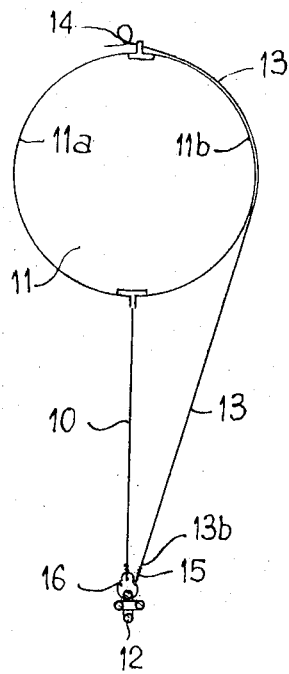
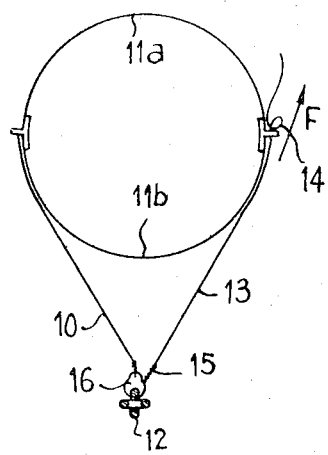
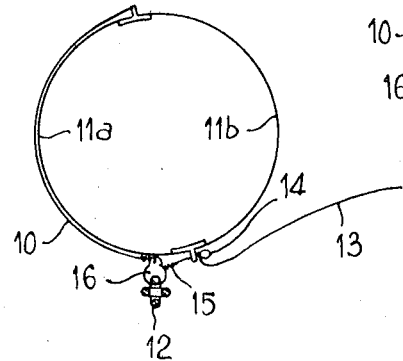
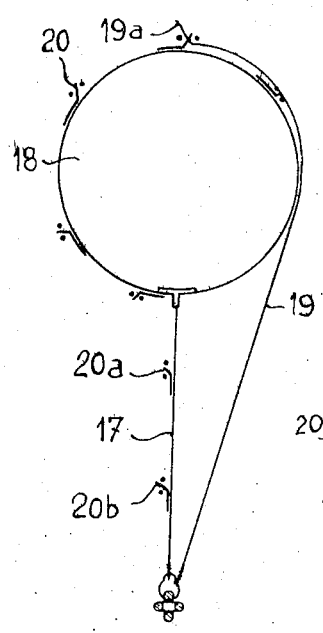
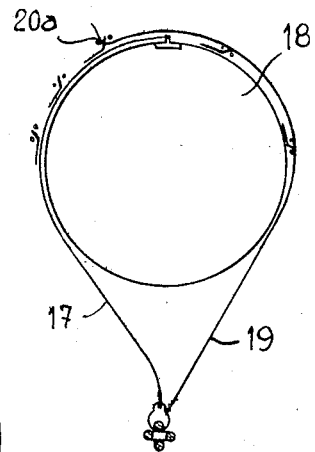
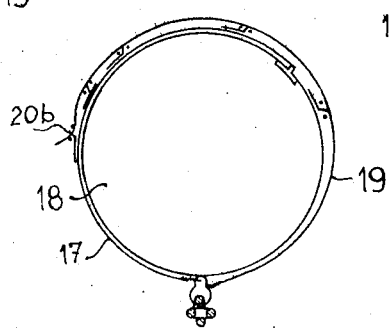

FLOATING ANTI-POLLUTION DEVICE

The present invention relates to a floating anti-pollution device such as a barrage or barrier intended to stop or gather the bodies or materials floating on the surface of waters of the type constituted by an apron or skirt supported by float elements.

All of the floating barrages or barriers of this type which actually exist, have a skirt or apron whose height is fixed once and for all during the manufacture of the barrier or barrage and which is the same over the entire length of the barrage.

However, if the barrage is towed for purposes of putting the same into place, not only the skirt is useless but it also constitutes a hinderance by its drag which causes at the same time a resistance to the forward movement and a diminution of its maneuverability.

Furthermore, it has been discovered that the defects of functioning of certain portions of the barrage device are due to the fact that, within these portions, the height of the skirt is not adapted or matched to the particular conditions, into which they are placed whereas the height of the skirt is suitable in other portions of the barrage placed into other conditions.

This is the case, for example, with the floating barrages which are displaced on the water to sweep a polluted surface and which are disposed in V-shape to form a recuperation pocket for the polluting bodies or materials.

The present invention has as its object to remedy the aforementioned inconveniences by permitting to modify the height of the skirt or apron of the floating anti-pollution device such as the barrage or barrier.

The present invention is characterized in particular by the fact that the floating anti-pollution devices such as the barrages comprise means such that for purposes of adapting each portion of the barrage to the conditions into which they are placed, the corresponding skirt or apron portion may be raised completely or partially in such a manner as to modify the height of the skirt or apron; by height of the skirt or apron is understood the height of the projection thereof on a vertical plane parallel to the longitudinal direction of the float elements.

According to one particular embodiment of the present invention the lifting device of the skirt, and thus of the draught, is constituted by an assembly of elements such as ropes or straps (these connecting elements will be referred to hereinafter for the sake of simplicity merely by straps though this invention is not limited thereto but is equally applicable to any analogous connecting elements) connecting the bottom of the skirt to the float element which is placed above the same; the length of these straps can be adjusted in such a manner that the skirt height can have different values.

As a result of the action on the straps, the height of the draught of the floating anti-pollution device such as the barrage may be modified by causing the height of the skirt of the barrage to vary with respect to the float elements, between a maximum value which may, for example, be equal to the width of the rectangle of fabric or other material forming the skirt and a minimum value which is practically zero. This latter position will, for example, be selected for purposes of rapidly towing the floating anti-pollution device such as the barrage up to its emplacement of utilization with a minimum of resistance to the towing and with best maneuverability.

The straps or analogous connecting elements are flexible or supple elements, for example, bands made of an imputrescible textile fabric and inert to the water in which the barrage will be used.

The straps with which the floating anti-pollution devices such as the barrages of the present invention are provided, offer also other advantages; for example, they permit to draw or pull the barrage and/or to easily place a complementary ballast means such as a chain passing between the straps and the bottom of the skirt.

Accordingly, it is an object of the present invention to provide a floating anti-pollution device of the type described above which avoids by simple means the aforementioned shortcomings and drawbacks.

Another object of the present invention resides in a floating anti-pollution device which can be easily handled, towed into place with minimum resistance and readily adapted to existing conditions.

A further object of the present invention resides in a floating anti-pollution device such as a barrier, barrage or weir which is equipped with a skirt or apron whose height can be readily adjusted to meet local conditions and exigencies.

These and other objects, features and advantages of the present invention will become more apparent from the following description when taken in connection with the accompanying drawing which shows, for purposes of illustration only, several embodiments in accordance with the present invention, and wherein:

FIG. 1 is a somewhat schematic cross-sectional view of a floating barrage-like anti-pollution device of the present invention with the height of the skirt being maximum;

FIG. 2 is a somewhat schematic cross-sectional view of the floating barrage-like anti-pollution device of FIG. 1 with the skirt thereof in another position;

FIG. 3 is a somewhat schematic cross-sectional view of the floating barrage-like anti-pollution device of FIG. 1 and 2 with the skirt thereof in still another position representing minimum height;

FIG. 4 is a somewhat schematic cross-sectional view through a modified embodiment of a floating barrage-like anti-pollution device in accordance with the present invention with the height of the skirt thereof being maximum;

FIG. 5 is a somewhat schematic cross-sectional view of the floating barrage-like anti-pollution device of FIG. 4, with the skirt thereof being in another position;

FIG. 6 is a somewhat schematic cross-sectional view of the floating barrage-like anti-pollution device of FIGS. 4 and 5 with the skirt thereof being in still another position;

Figure 7:
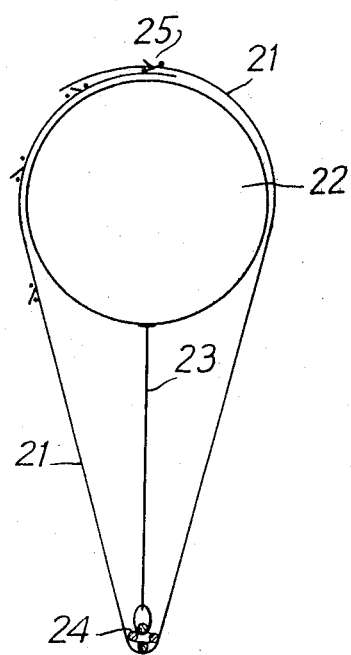
FIG. 7 is a somewhat schematic cross-sectional view through a still further modified embodiment of a floating barrage-like anti-pollution device according to the present invention with the skirt thereof at its maximum height.

Referring now to the drawing wherein like reference numerals are used throughout the various views to designate like parts, the floating anti-pollution device of FIG. 1, such as a barrage, a weir or a barrier is constituted by a skirt or apron 10 provided with a ballast element, for example, a chain 12 and is maintained by a sausage-like float element inflated with air or filled with a solid material of slight density. The skirt 10 is constituted by a rectangle of rubberized fabric or the like which is extended in the upward direction by a portion 11a to form the sausage-like float member 11 by bonding, gluing or sewing together the portion 11a with another piece of fabric 11b.

At certain intervals, for example every meter, straps 13 connect the bottom of the skirt 10 with the upper portion of the sausage-like float member 11.

In the embodiment of FIG. 1, the end 14 of the strap 13 is introduced into an eyelet provided within a fabric band carried by the sausage-like float member 11 (this band serving also to assemble the portions 11a and 11b) and it is held in place by a knot which prevents the end 14 of the strap 13 to come out of the eyelet. The strap 13 is fixed to the lower portion of the skirt 10 by a ring 15 fixed to its end 13b (FIG. 1), which ring 15 is hooked into another ring 16 which, in its turn, is fixed to the skirt 10 in a conventional manner and to which the ballast chain 12 is secured, for example also hooked in; if the strap 13 does not have to slide in the fixing means fastening the same to the skirt 10, it is also possible to fix the same by bonding or sewing or in any other known manner.

The connection of the strap 13 to the sausage-like floating member 11 permits the strap 13 to slide within the eyelet; by pulling at the end 14 of the strap 13 and by fixing the latter in its new position simply by a knot, the height of the skirt 10 is reduced.

FIGS. 2 and 3 illustrate the floating anti-pollution device of FIG. 1 in two positions of the skirt 10 resulting from a diminution of the length of the connection between the bottom of the skirt 10 and the sausage-like float element 11 obtained by pulling the strap 13 in the direction of the arrow F (FIG. 2). As can be seen in FIG. 2, the skirt 10 having been lifted and having entrained the chain 12 in this movement, the float member 11 has pivoted until the center of gravity of the assembly is in the vertical plane of the center of the upward thrust; furthermore, the skirt 10, in lieu of being vertical, is now inclined which, as experience has demonstrated, is a condition favorable to the stoppage of polluting substances.

FIG. 3 illustrates the skirt 10 of the floating anti-pollution device completely wound about the semi-circumference of the sausage-like float member 11; if the skirt 10 has the same dimension as the semi-circumference of the sausage-like float member 11, the latter has pivoted through 180°. When the skirt 10 is in this position, the barrage or barrier offers the minimum drag and the greatest handling ability and maneuverability.

In this embodiment, the height of the skirt 10 may assume any value comprised between a height of zero (FIG. 3) and a maximum height corresponding to the vertical position of the skirt 10; the skirt 10 may also be inclined, as shown in FIG. 2, which is desirable.

Moreover, as has been indicated, the straps 13 permit to readily fix a supplementary ballast either to the entire floating anti-pollution device or only to certain of its portions. This is particularly interesting, for when the anti-pollution device, such as the illustrated barrier is in place, it becomes frequently indispensable to add or withdraw ballast either over its entirety or only over certain of its portions.

However, as in the floating anti-pollution device of FIGS. 1 to 3, the straps permit to string in the longitudinal direction of the barrage or barrier a complementary ballast element such as a chain which is then placed between the skirt 10 and the straps 13 and is maintained by the same.

The floating anti-pollution device such as a weir, barrage or barrier of FIGS. 4, 5 and 6 represents a modified embodiment of the present invention. Loops 20 or analogous elements such as rings or hooks are placed within the transverse planes passing through the straps 19 along the circumference of the sausage-like float member 18 and eventually along the skirt or apron 17, to which are fastened or hooked the ends 19a of the straps 19.

Thus, the end 19a of the straps 19 is fixed to the one of the loops 20 which corresponds to the draught that one desires to impact to the barrage. FIG. 5 illustrates an intermediate position of the skirt 17 in which the extremity of its strap 19 is fixed to the loop 20a placed along the skirt 17 (FIG. 4). FIG. 6 illustrates the skirt 17 completely wound about the sausage like float member 18, whereby the strap 19 is fixed to the end loop 20b also located on the skirt 17 below the loop 20a.

Regardless of what the height of the skirt 17, one can wind the same until it is wound completely on the sausage-like float member 18. This offers the advantage of permitting a construction of the barrage whose skirt height varies between extremely different values.

Figure 8:
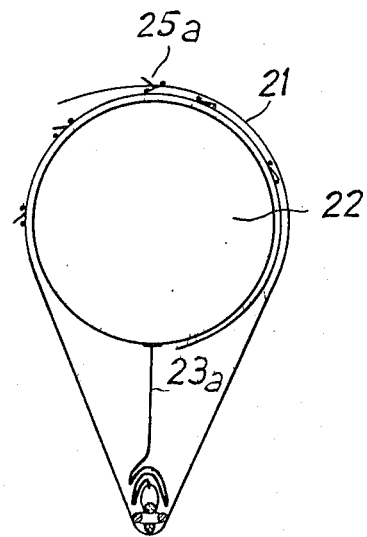
FIG. 8 is a somewhat schematic cross-sectional view of the floating barrage-like anti-pollution device of FIG. 7 with the skirt thereof shown in another position.

The floating anti-pollution device such as a barrage or barrier of FIGS. 7 and 8 comprises a strap 21 which surrounds the barrage in a symmetrical manner with respect to a vertical plane of the barrage passing through the skirt or apron 23 and the axis of the sausage-like float member 22. The strap 21 is neither fixed to the float member 22 nor to the skirt 23 but its two ends are tied together by loops 25 placed along one of the end portions of the strap 21 in such a manner that the strap is rendered endless, each strap passing underneath the ballast 24 of the skirt 23 such that when lengthening or shortening the strap with the aid of adjacent loops, the ballast 24 is lifted or lowered which corresponds to a diminution or increase of the height of the skirt 23. FIG. 8 illustrates the skirt 23 of FIG. 7 partially lifted by a shortening of the strap 21.

In this embodiment, the skirt 23 remains always in its plane which avoids the rotation of the sausage-like float member 22 as in the preceeding embodiment.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. In a floating anti-pollution device for stopping bodies and materials floating on the surface of water, said device being of the type having a skirt means supported by float means, the improvement comprising means for regulating the draught of the device, characterized in that said means for regulating the draught includes a plurality of connecting means, each of said plurality of connecting means connected to said skirt means and said float means at intervals in the longitudinal direction of said skirt means and said float means individually varying the height of said skirt means at said intervals, thereby regulating the draught of the device at said intervals, and further characterized in that said skirt means is maintained at least partially wound about said float means by said connecting means.

2. A device according to claim 1, characterized in that said skirt means is held completely wound about said float means by said connecting means.

3. A device according to claim 1, characterized in that said skirt means supported below said float means is inclined with respect to the vertical.

4. A device according to claim 1, characterized in that the float means are sausage-like float elements.

5. A device according to claim 1, characterized in that the skirt means is constituted by a fabric material.

6. A device according to claim 1, characterized in that the skirt means is constituted by rubberized fabric material constituting a barrier to the floating bodies and materials.

7. A device according to claim 1, characterized in that each said connecting means is operatively connected to the bottom portion of the skirt means and to the float means.

8. A device according to claim 7, characterized in that the connecting means are in the form of strap means.

9. A device according to claim 8, characterized in that the strap means slides within eyelet means fixed to the float means.

10. A device according to claim 8, characterized in that a complementary ballast element is placed between the strap means and the lower portion of the skirt means.

11. A device according to claim 7, characterized in that each connecting means includes means rendering the same endless, the endless connecting means surrounding the assembly constituted by the float means and the skirt means, whence the float means remains immovable during the modification of the height of the skirt means.

12. A device according to claim 11, characterized in that the means rendering the connecting means endless includes loops.

13. A device according to claim 12, characterized in that the connecting means are in the form of strap means.

14. A device according to claim 7, characterized in that fastening means are secured on the float means which enable fastening thereto of the connecting means.

15. A device according to claim 14, characterized in that said fastening means are also provided on the skirt means.

16. A device according to claim 15, characterized in that said fastening means are in the form of loops, hooks and analogous devices.

17. A floating anti-pollution device intended to stop bodies or materials floating on the surface of water, which includes a skirt means supported by float means, characterized in that it comprises means enabling the height of the skirt means to be modified in such a manner as to regulate the draught of the device, and in that said means includes connecting means operatively connected to the bottom portion of the skirt means and to the float means, and further characterized in that the skirt means is maintained at least partially wound about the float means by the connecting means.

18. A device according to claim 17, characterized in that the skirt means is held completely wound about the float means by the connecting means.

* * * * *